United States Patent [19]
Zuranski et al.

[11] Patent Number: 6,161,203
[45] Date of Patent: Dec. 12, 2000

[54] COMMUNICATION SYSTEM UTILIZING REED-SOLOMON CODE TO ACHIEVE AUTO FRAME SYNCHRONIZATION ACQUISTION

[75] Inventors: Edward S. Zuranski, Largo; Kenneth D. Ko, Clearwater; Jamal Haque, Tampa; Shrenik P. Patravali; Manuel I. Rodriguez, both of St. Petersburg; Keith A. Souders, Tampa; Anthony A. Tzouris, Clearwater, all of Fla.

[73] Assignee: Conexant Systems, Inc., Newport Beach, Calif.

[21] Appl. No.: 09/028,210

[22] Filed: Feb. 23, 1998

Related U.S. Application Data

[63] Continuation-in-part of application No. 08/943,484, Oct. 3, 1997.

[51] Int. Cl.[7] ............................. H04L 7/00; H03M 11/33
[52] U.S. Cl. ........................................... 714/707; 714/775
[58] Field of Search .................................. 714/704, 706, 714/707, 775, 789, 774

[56] References Cited

U.S. PATENT DOCUMENTS

| | | | |
|---|---|---|---|
| 3,988,677 | 10/1976 | Fletcher et al. | 325/41 |
| 4,020,461 | 4/1977 | Adams et al. | 340/146.1 AL |
| 4,333,175 | 6/1982 | Cook et al. | 370/56 |
| 4,689,783 | 8/1987 | Kaczerowski | 370/56 |
| 4,700,340 | 10/1987 | Beranek et al. | 370/16 |
| 4,761,779 | 8/1988 | Nara et al. | 370/58 |
| 4,766,594 | 8/1988 | Ogawa et al. | 371/22 |
| 4,799,217 | 1/1989 | Fang | 370/68.1 |
| 4,961,186 | 10/1990 | Chandramouli et al. | 370/79 |
| 5,132,991 | 7/1992 | McNesby et al. | 375/116 |
| 5,144,625 | 9/1992 | Cain et al. | 370/110.1 |
| 5,243,593 | 9/1993 | Timbs | 370/58.1 |
| 5,297,145 | 3/1994 | Havermans | 370/100.1 |
| 5,367,540 | 11/1994 | Kakuishi et al. | 375/103 |
| 5,400,322 | 3/1995 | Hunt et al. | 370/19 |
| 5,408,260 | 4/1995 | Arnon | 348/6 |
| 5,410,343 | 4/1995 | Coddington et al. | 348/7 |
| 5,422,894 | 6/1995 | Abe et al. | 371/37.4 |
| 5,428,646 | 6/1995 | Eyuboglu | 375/354 |
| 5,442,693 | 8/1995 | Hays et al. | 379/308 |
| 5,461,616 | 10/1995 | Suzuki | 370/79 |
| 5,479,447 | 12/1995 | Chow et al. | 375/260 |
| 5,519,731 | 5/1996 | Cioffi | 375/260 |

(List continued on next page.)

OTHER PUBLICATIONS

Patent application for "Digital Subscriber Line Modem Utilizing Echo Cancellation to Reduce Near–End Cross–Talk Noise", filed Feb. 23, 1998, inventors: Zuranski, et al., Serial No. not yet assigned.

Patent application for "Method of and Apparatus for Performing Line Characterization in a Non–Idle Mode in a Subscriber Line Communication System", filed Feb. 23, 1998, inventors: Souders, et al., Serial No. not yet assigned.

Patent application for "Method of and Apparatus for Performing Line Characterization in a Subscriber Line Communication System", filed Feb. 23, 1998, inventors: Ko, et al., Serial No. not yet assigned.

*Primary Examiner*—Stephen M. Baker
*Attorney, Agent, or Firm*—Foley & Lardner

[57] ABSTRACT

A digital subscriber line communication system does not require the use of a plain old telephone service (POTS) splitter in the resident's home. Digital signal processing is utilized to adapt to varying subscriber line conditions coming from POTS telephone equipment. The digital subscriber line modem includes a control circuit that utilizes a Reed-Solomon decoder and a synchronization error generator. The Reed-Solomon decoder provides a frame error signal, and the synchronization error generator responds to the frame error signal to generate a synchronization error signal. The synchronization error generator is configured as a leaking integrator to provide the synchronization error signal in response to a relatively large number of frame error signals occurring in a period of time. A resynchronization operation is performed in the modem in response to the synchronization error signal.

20 Claims, 7 Drawing Sheets

U.S. PATENT DOCUMENTS

| | | | |
|---|---|---|---|
| 5,528,281 | 6/1996 | Grady et al. | 348/7 |
| 5,534,912 | 7/1996 | Kostreski | 348/6 |
| 5,559,858 | 9/1996 | Beveridge | 379/56 |
| 5,572,537 | 11/1996 | Mizutani et al. | 371/46 |
| 5,592,540 | 1/1997 | Beveridge | 379/184 |
| 5,596,604 | 1/1997 | Cioffi et al. | 345/260 |
| 5,610,983 | 3/1997 | Stewart | 380/48 |
| 5,625,404 | 4/1997 | Grady et al. | 348/7 |
| 5,627,501 | 5/1997 | Biran et al. | 333/17.1 |
| 5,627,863 | 5/1997 | Aslanis et al. | 375/357 |
| 5,699,365 | 12/1997 | Klayman et al. | 371/5.5 |
| 5,719,883 | 2/1998 | Ayanoglu | 371/35 |
| 5,751,701 | 5/1998 | Langberg et al. | 370/281 |

COMMUNICATION SYSTEM UTILIZING REED-SOLOMON CODE TO ACHIEVE AUTO FRAME SYNCHRONIZATION ACQUISTION

CROSS-REFERENCE TO RELATED APPLICATIONS

The present application is a continuation-in-part of U.S. application Ser. No. 08,943,484, filed Oct. 3, 1997, by Henderson, et al., entitled "SPLITTERLESS DIGITAL SUBSCRIBER LINE COMMUNICATION SYSTEM".

FIELD OF THE INVENTION

The present invention relates generally to communication systems. More particularly, the present invention relates to a system for and a method of determining when a synchronization error occurs in a communication system.

BACKGROUND OF THE INVENTION

Communication systems, such as, wireless, optical, spacecraft, satellite, subscriber line, or cellular communication systems, often transmit and receive signals representing encoded and/or compressed data. The coded data or digital information can represent audio, video, voice, programs, software, pictures, graphics, databases, or other material. The data is generally serially provided through a coder to a transmitter which transmits the coded data. The coded data is received by a receiver that includes a decoder for decoding the coded data. The coded data is often provided in a frame or other unit.

Figure 1:
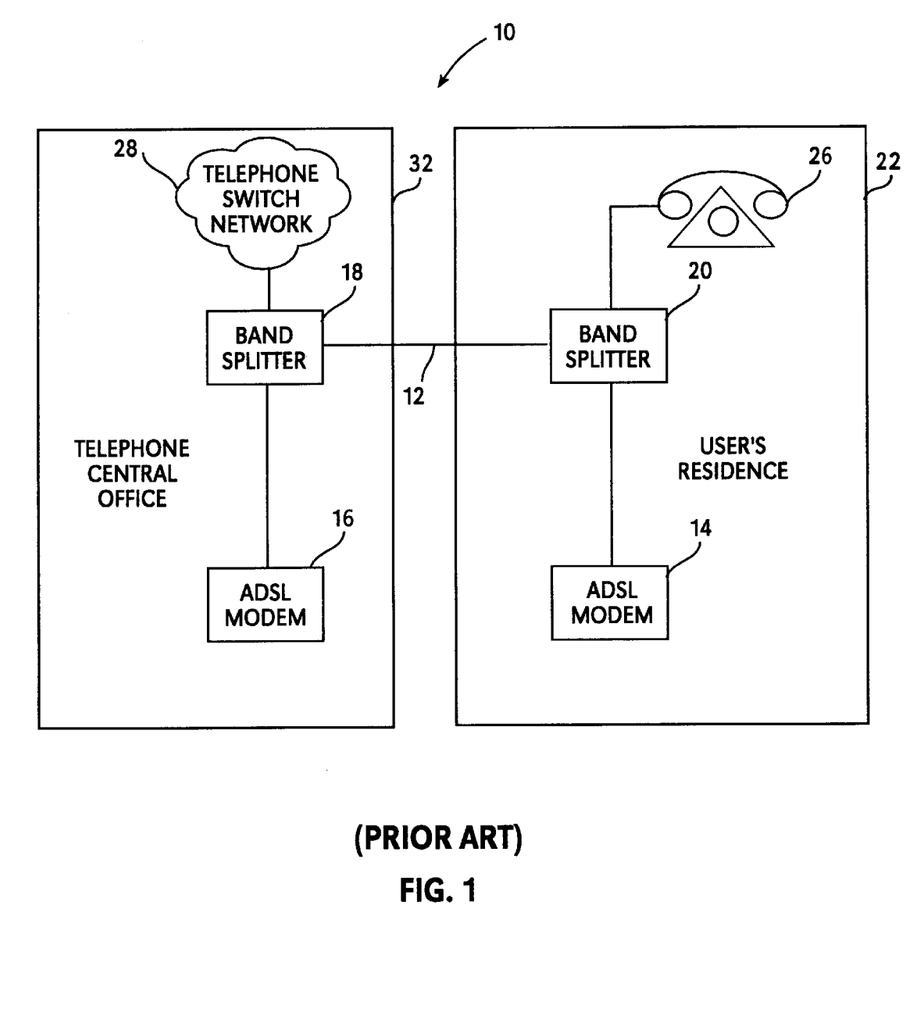
FIG. 1 is a schematic block diagram of a prior art ADSL communication system.

Communication systems are discussed below with reference to an exemplary communication system which utilizes a subscriber line as a communication media. For example, a conventional asymmetric digital subscriber line (ADSL) system 10 includes a copper twisted pair analog subscriber line 12, an ADSL modem 14, an ADSL modem 16, a band splitter 18, and a band splitter 20. Line 12 is a plain old telephone service (POTS) local loop or wire connecting a central office 32 of the telephone company to a user's residence 22. In system 10, coded data is communicated across line 12 between modems 14 and 16.

ADSL modem 14 is located in user's residence 22 and provides data to and from subscriber line 12. The data frames or coded data can be provided from line 12 through modem 14 to various equipment (not shown) coupled to modem 14. Equipment, such as, computers, facsimile machines, network devices, servers, or other devices, can be attached to modem 14. Modem 14 communicates with a data network (not shown) via ADSL modem 16 across line 12. Modem 16 receives and transmits signals carrying the data frames from and to line 12 to modem 14. The data network can be coupled to other networks (not shown), including the internet.

At least one analog telephone 26, located in residence 22, can be coupled to subscriber line 12 for communication across line 12 with a telephone switch network 28. Telephone 26 and telephone switch network 28 (e.g., public-switched telephone (PST) network) are conventional systems well-known in the art. Alternatively, other analog equipment, such as, facsimile machines, POTS modems, answering machines, and other telephonic equipment, can be coupled to line 12 in user's residence 22.

System 10 requires that band splitter 18 and band splitter 20 be utilized to separate higher frequency ADSL signals and lower frequency POTS signals. For example, when the user makes a call from residence 22 on telephone 26, lower frequency signals (under 4 kilohertz (kHz)) are provided through band splitter 20 to subscriber line 12 and through band splitter 18 to telephone switch network 28 in central office 32. Band splitter 18 prevents the lower frequency POTS signals from reaching ADSL modem 16. Similarly, band splitter 20 prevents any of the POTS signals from reaching modem 14.

ADSL modem 16 and ADSL modem 14 communicate higher frequency ADSL signals across subscriber line 12. The higher frequency ADSL signals are prevented from reaching telephone 26 and telephone switch network 28 by band splitters 20 and 18, respectively. Splitters 18 and 20 are preferably passive analog filters or other devices which separate lower frequency POTS signals (below 4 kHz) from higher frequency ADSL signals (above 50 kHz).

Communication systems can utilize a variety of coding and decoding schemes to communicate data between locations, such as, residence 22 and office 32. Some schemes arrange the data in packets or frames comprised of multi-bit segments. The frames can be of fixed or variable length and are transmitted and received on a frame-by-frame basis. The frames are often encoded in accordance with an error correction technique.

Error correction techniques often provide error correction data within the frame of data. The error correction data is utilized to ensure that the frame of data has been transmitted and received properly. The error correction data can include parity bits, check symbols, or redundant symbols. For example, Reed-Solomon (R/S) error correction techniques provide N symbols (e.g., bytes) in a frame. Of the N symbols, K symbols are the actual payload or data associated with the frame. The remaining symbols (e.g., N–K) in the frame are utilized to correct symbols within the frame.

In an R/S system, the error processor is able to correct t symbols, where $t='(N-K)/2$. For example, in a system where N=204 bytes and K=188 bytes, 8 bytes in the frame are correctable, (204–188)/2=8. However, if more than 8 bytes (e.g., more than t symbols) in the frame are in error or corrupted, the frame cannot be corrected by the R/S system, and a frame error has occurred.

According to the R/S technique or other error correction technique, the frame must be retransmitted if there is a frame error (e.g., more then t symbols in error). Retransmitting a frame is disruptive to the communication process and can slow the overall transmission of data considerably. In fact, communication may even be faster at a lower data rate if less frames must be retransmitted due to uncorrectable errors in a frame. Therefore, it is desirous to minimize the number of frames which must be retransmitted in a communication system (e.g., to minimize the number of frame errors).

Frame errors can be the result of a synchronization error between the transmitter and the receiver in the communication system. Synchronization errors can occur due to a loss of signal, to an impulse on the communication medium (e.g., a transmission line), or to a momentary loss of a connection. In communication systems which utilize telephone subscriber lines, synchronization errors can be caused by interference or noise on the subscriber lines. These synchronization errors can often require a retrain operation, which can take a significant amount of time. Also, if synchronization errors go undetected, the communication system can experience a large number of frame errors, which slows the communication process.

Thus, there is a need for a frame error circuit which can detect when a synchronization error has occurred. Further, there is a need for a synchronization error generation circuit which does not require additional data or significant hardware overhead and which can be inexpensively implemented in a frame-coding technique. Further still, there is a need for a digital subscriber line (DSL) modem which can resynchronize frames in response to the determination of a frame synchronization error. Further still, there is a need for a DSL modem which is resynchronized in response to frame errors in a Reed-Solomon frame.

SUMMARY OF THE INVENTION

The present invention relates to a synchronization circuit for use in a communication system utilizing a Reed-Solomon decoder with a frame error output. The synchronization circuit includes an input, an output, and control circuit. The input is coupled to the frame error output. The control circuit is coupled to the input and the output. The control circuit receives the frame error output signal and generates a synchronization signal in response to a threshold of frame error output signals occurring during communication of a number of frames.

The present invention still further relates to a method of generating a synchronization signal in a modem. The modem has a decoder with a frame error output. The decoder provides a frame error output signal at the frame error output. The frame error output signal has a first characteristic when the decoder is unable to correct errors in the frame and a second characteristic when the decoder is able to correct errors in the frame. The method includes steps of receiving the frame error output signal, adding a first value to a sum if the frame error output signal has the first characteristic, subtracting a second value from the sum if the frame error output signal has a second characteristic, and generating the synchronization signal if the sum is above a threshold.

The present invention still further relates to an asynchronous digital subscriber line modem for transmitting and receiving frames of data on a subscriber line. The modem includes error-processing means for generating a frame error signal when a frame contains errors which are not corrected by the error-processing means and a signal-generating means for receiving the frame error signal and for providing a synchronization signal. The synchronization signal is provided in response to a quantity of frame error output signals being received over a number of frames.

According to an exemplary aspect of the present invention, a Reed-Solomon processing scheme generates a synchronization signal in response to frame error signals which indicate that resynchronization is necessary.

According to another exemplary aspect of the present invention, the synchronization error signal is generated by a "leaky" integrator which receives a frame error signal from a Reed-Solomon decoder. The leaky integrator adds a predetermined factor to a sum in response to an uncorrectable frame and subtracts a predetermined factor from the sum when the frame is error free or correctable. Preferably, the sum is compared to a threshold which is variable in accordance with data rates and with user specifications.

In accordance with still a further exemplary aspect of the present invention, a synchronization signal is utilized to provide a rapid resynchronization of a DSL modem. By utilizing a synchronization signal, a full retrain operation does not have to be implemented when reacquiring synchronization. For example, in response to momentary problems in a subscriber line, resynchronization can be performed without changing data rates, equalization parameters, or other retrain parameters.

BRIEF DESCRIPTION OF THE DRAWINGS

The invention will be further described with reference to the accompanying drawings, wherein like numerals denote like elements, and.

DETAILED DESCRIPTION OF THE PREFERRED EMBODIMENTS

Figure 2:
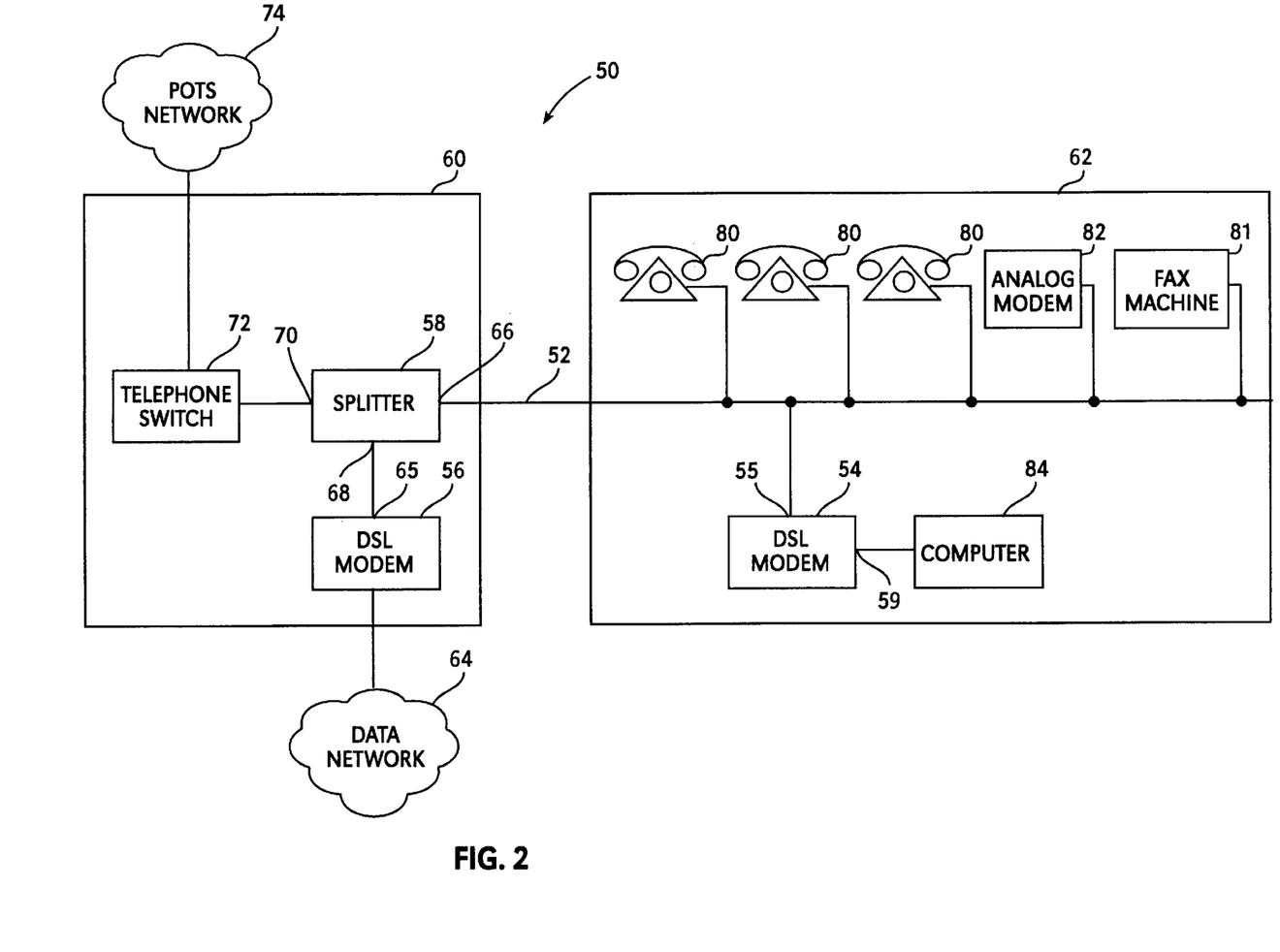
FIG. 2 is a schematic block diagram of a communication system in accordance with an exemplary embodiment of the present invention, the communication system includes DSL modems in accordance with another exemplary embodiment of the present invention.

With reference to FIG. 2, a DSL communication system 50 includes a copper twisted pair subscriber line 52, a customer or residential DSL modem 54, a remote or central office DSL modem 56, and a band splitter 58. Subscriber line 52 is a local loop, such as, a twisted pair of American wire gauge (AWG) 24 or 26 copper wires, which connects a central office 60 and a residence 62. Residence 62 can also be an office, a building, or other facility. Similarly, central office 60 can be any facility associated with a provider of telephone services.

DSL modem 56 is coupled to a data network 64. Splitter 58 has a signal input 66 coupled to subscriber line 52, a higher-frequency output 68 coupled to DSL modem 56, and a lower-frequency output 70 coupled to a telephone switch 72. Telephone switch 72 is coupled to a POTS network 74. DSL modem 56, splitter 58, and telephone switch 72 are preferably located in central office 60. Alternatively, splitter 58 could be included as part of DSL modem 56 (e.g., DSL modem 56 is provided as an in-line device between subscriber line 52 and switch 72).

In residence 62, one or more telephones 80, analog facsimile machine 81, and analog modem 82 can be coupled directly to subscriber line 52 as is well known in the art. Telephones 80 can be any of conventional communication devices, including answering machines, which can be coupled to subscriber line 52 to provide various POTS functions.

DSL modem 54 is coupled directly to subscriber line 52 at a data terminal or digital subscriber line access 55. DSL modem 54 is also coupled to a computer 84. Alternatively, DSL modem 54 could be coupled to other devices (not shown), such as, a network, a server, or other communication or computing device.

Unlike conventional ADSL communication systems, such as, system 10 described with reference to FIG. 1, DSL modem 54 does not utilize a splitter between modem 54 and subscriber line 52 and between telephones 80 and subscriber line 52. DSL modem 54 eliminates the need for a splitter in residence 62 by advantageously utilizing digital signal-processing techniques to adapt to varying subscriber line characteristics caused by analog equipment, such as, telephones 80, machine 81, and modem 82. DSL modem 54 can operate concurrently with any of telephones 80, machine 81, and analog modem 82.

DSL modem 54 preferably includes digital subscriber line access 55, which is part of a standard connector (e.g., an RJ11 walljack) and is coupled to subscriber line 52 in similar fashion as conventional telephones 80 and analog modems 82. Access 55 is preferably a two-wire terminal.

Figure 3:
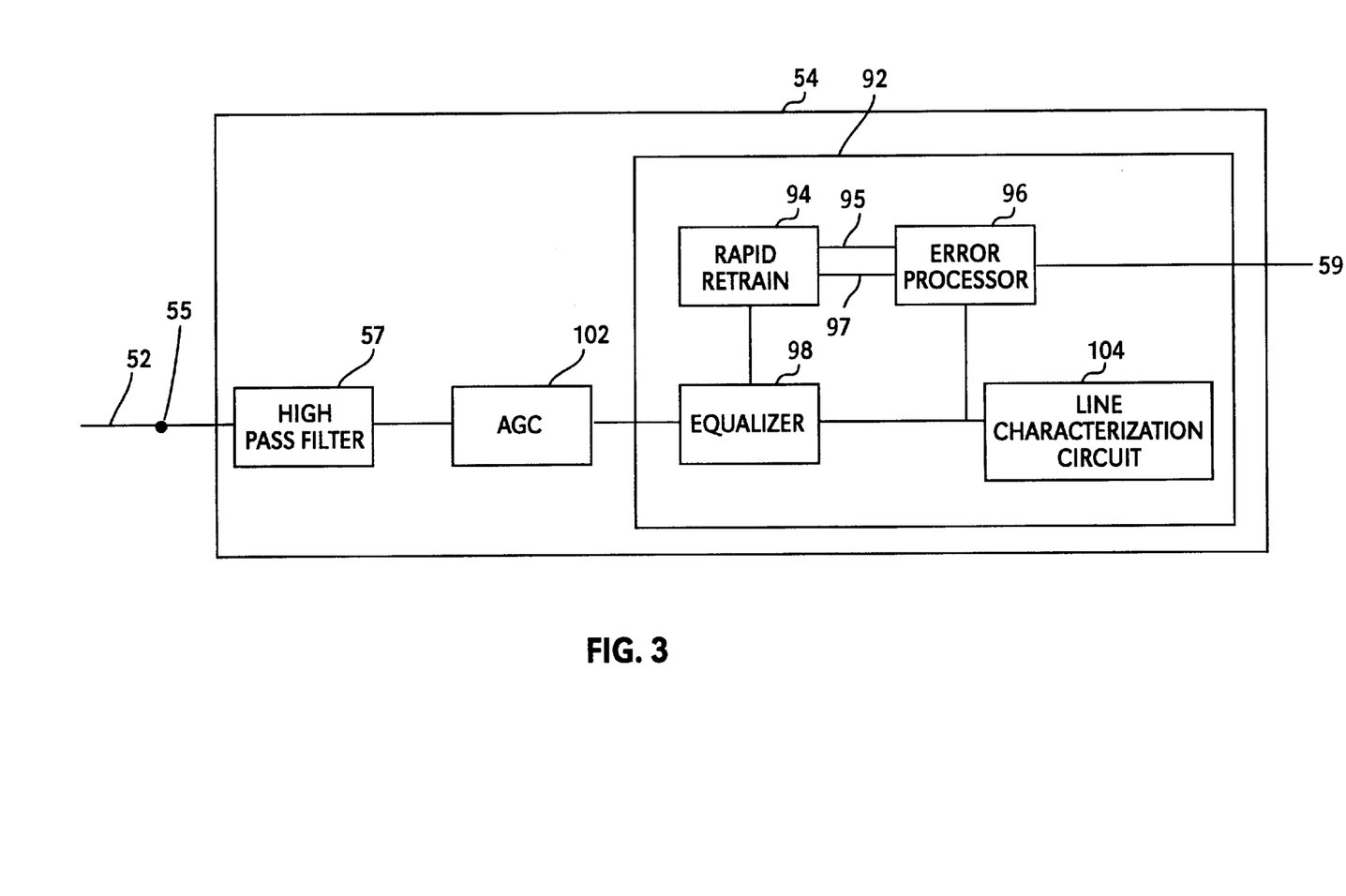
FIG. 3 is a more detailed schematic block diagram of the DSL modem illustrated in FIG. 2, the DSL modem includes a control circuit in accordance with yet another exemplary embodiment of the present invention.

Modem 54 can be provided as an internal device in computer 84, such as, on a PCI card, or as an external device. Preferably, modem 54 is an internal device so that high speed communications between modem 54 and computer 84 are not slowed by serial ports associated with computer 84. As an external device, modem 54 could be coupled through a printer port or a universal serial bus (USB) to computer 84. In FIG. 3, modem 54 is coupled to computer 84 via a data terminal 59.

Modem 54 is preferably implemented with a digital signal processing chip set. Other suitable processors can be utilized to run software modules to implement the operations described in the present application. The software modules implement most tasks associated with modem 54. The tasks include digital filtering, line characterization, modulation, demodulation, gain control, equalization, initialization error correction, test functions, and other modem requirements.

In operation, modem 54 adjusts operating characteristics, such as, equalization parameters, gain, and data rates, according to variables associated with line 52. Modem 54 is capable of receiving data at least at a one megabit per second (Mbps) data rate when line 52 is approximately 12 kilofeet and when all of telephones 80 are on-hook. Preferably, the reception (downstream) data rate is no worse than a 256 Kbps data rate in the presence of POTS-related impairments associated with telephones 80. Modem 54 is capable of transmitting data at least at a 100 Kbps data rate when line 52 has a length of 12 kilofeet and when all telephones 80 are on-hook. The transmission (upstream) data rate is preferably no worse than a 64 Kbps in the presence of POTS-related impairments. By utilizing lower data rates than maximum ADSL data rates, such as, 6 Mbps, modem 54 can be manufactured less expensively and is more able to withstand POTS-related impairments.

DSL modem 56 is similar to DSL modem 54. However, modem 56 preferably is a lower-power modem to minimize the power consumed by central office 60. Additionally, modem 56 can have a sleep mode so that when modem 56 is not being accessed, significant power is not consumed by modem 56. Modem 56 can have a lower-cost receiver unit (not shown) because upstream data rates are lower than downstream data rates, as discussed above. In the sleep mode, processors and other electronic devices in modem 56 are placed in a low-power or no-power mode by slowing or stopping clock signals within modem 56. If modem 54 is utilized within a laptop computer, lower-power techniques are desirable for modem 54 as well.

Modem 54 advantageously utilizes digital signal processing techniques to characterize and to classify interference sources going both to the POTS portion of the spectrum from the DSL portion of the spectrum and from the POTS portion of the spectrum to the DSL portion of the spectrum. Modem 54 compensates for these interference sources with digital signal processing techniques. For example, when telephone 80 is brought off-hook, an impedance change occurs on line 52. Modem 54 can adjust data rates, gain characteristics, and filter parameters to compensate for the impedance change. Thus, modem 54 can utilize digital signal processing techniques to compensate for interference from POTS equipment, such as, telephone 80. Preferably, the digital signal processing techniques can rapidly adjust to interference sources so communication latency are not noticeable to the user.

In operation, DSL modems 54 and 56 communicate signals as quadrature amplitude modulated (QAM) signals. DSL modems 54 and 56 communicate data at various constellation sizes, ranging from 4 to 256 UC points. The data is transmitted in Reed-Solomon frames, where the R-S code rate is 0.941176471 (K/N) and N=68 and K=64. Alternatively, other values for N and K can be utilized to optimize data and frame rates.

DSL modem 54 transmits upstream signals in a lower-frequency range and receives downstream signals in a higher-frequency range, in accordance with frequency division multiplexing techniques. For example, modem 54 preferably transmits upstream signals at a carrier frequency between a lower band edge of 46 kHz and an upper band edge of 114 kHz. Modem 54 transmits upstream signals at a line rate (e.g., bandwidth or data rate) of 136 Kbps for a constellation sizes of 4 points and at a data rate of 340 Kbps for a constellation size of 32 points. Modem 56 receives the upstream signals at the same rates. Data rates are across channel, before error-coding bits (Trellis and Reed-Solomon) are removed.

DSL modem 56 transmits downstream signals at a carrier frequency between a lower band edge of 265.5 kHz and an upper band edge of 605.5 kHz. DSL modem 56 transmits downstream signals at data rate of 680 Kbps for a constellation size of 4 points and at a data rate of 1.7 Mbps for a constellation rate of 32 points. Modem 54 receives the downstream signals at the same rates. Alternatively, other carrier frequencies can be utilized for transmitting downstream information. The use of frequency division multiplexing eliminates the need for an echo canceler (not shown), thereby eliminating nonlinear effects of echo-canceling.

Modems 54 and 56 can utilize a variety of protocols to transmit and receive upstream and downstream signals. Modems 54 and 56 could additionally utilize an auxiliary channel within a control frequency band for transmitting control information between modems 54 and 56. Modems 54 and 56 can also utilize various error protocols, such as, Read-Solomon coding, multidimensional Trellis coding, or other protocols, to gain higher immunity to noise and to other phone line impairments. Trellis coding is a method of forward error correction where each signal element is assigned a coded binary value representing the element's phase and amplitude. The coding allows the receiving modem to determine, based on the value of the receiving signal, whether or not a given signal element is received in error.

With reference to FIG. 3, modem 54 includes a high-pass filter 57 coupled between digital subscriber line access 55, which is coupled to subscriber line 52, and a control circuit 92. High-pass filter 57 preferably has a threshold frequency above 4 kHz and beneath the lowest band carrier edge for the DSL signals (e.g., 46 kHz) to prevent POTS signal from entering modem 54. Control circuit 92 includes a rapid retrain module or circuit 94, an error processor 96, a line characterization module or circuit 104, and an equalizer 98. Additionally, an automatic gain control circuit (AGC) 102 is disposed between high-pass filter 57 and equalizer 98.

Circuit 102 can be an analog circuit. Alternatively, circuit 102 can be a digital circuit located in control circuit 92 or a hybrid analog and digital circuit. Filter 57 can be a passive filter with a threshold frequency of 10 kHz.

Equalizer 98 is a digital filter through which signals are transmitted and received to and from line 52. Equalizer 98 can be on a receive side of control circuit 92, a transmit side of control circuit 92, or both. Equalizer 98 is an adaptive compensation circuit for counteracting distortions on line 52.

Equalizer 98 is preferably a decision feedback equalizer defined by tap coefficients. Equalizer 98 is implemented by a digital signal processor (not shown) running a software program. In the receive mode, equalizer 98 provides filtered signals to error processor 96 as well as other portions of control circuit 92. The filtered signals are processed by circuit 92 and provided at data terminal 59. In the transmit mode, other filters or equalizers can filter or preemphasize signals provided by circuit 92 to line 52.

Equalizer 98 must be converged (e.g., tuned) so the constellation associated with QAM signals are appropriately situated for decoding. Alternatively, equalizer 98 can be any device, digital or analog, for reducing frequency or phase distortion, or both, on subscriber line 52 by the introduction of filtering to compensate for the difference in attenuation or time delay, or both, at various frequencies in the transmission and reception spectrums.

Rapid retrain circuit 94 provides control signals (e.g., tap coefficients) to equalizer 98 to converge equalizer 98, thereby compensating for distortion on line 52. Rapid retrain circuit 94 causes equalizer 98 to converge in response to a raise-rate rapid retrain signal provided by error processor 96 on a line 97. Rapid retrain circuit 94 also causes equalizer 98 to converge in response to a lower rate rapid retrain signal provided by error processor 96 on a line 95. Rapid retrain circuit 94 can utilize tap coefficients developed by line characterization circuit 104. As discussed in more detail below, circuit 104 can store a number of coefficients for known error conditions in a flash memory or other storage device. Alternately, the coefficients can be interactively determined, as discussed below.

Error processor 96 monitors signals from equalizer 98 to determine if significant errors in the communication of data on line 52 are occurring. If significant errors are occurring, a lower-rate rapid retrain signal is provided on line 95 so rapid retrain circuit 94 retrains modem 54. If few errors are occurring, and data is communicated at a lower data rate, a raise-rate rapid retrain signal is provided on line 97 so circuit 94 retrains modem 54 to communicate data at a higher rate.

As part of the retrain operation, modem 54 performs a variety of tasks to ensure accurate data communication. A retrain operation for modem 54 can include the following tasks: reacquiring timing from a remote modem, such as, modem 56, converging equalizer 98, and adjusting the data rate. Additionally, the retrain operation can also include characterizing line 52 and adjusting the automatic gain control circuit 102. Depending on modem 54 and on line 52 parameters, circuit 94 can perform different levels of retrain operations.

In a slow retrain or initialization operation, a retrain operation from initiation variables (e.g., scratch) of modem 54 can include reacquiring timing, characterizing line 52, adjusting circuit 102 from initialization variables, converging equalizer 98 from initialization variables, and determining a data rate. Characterizing line 52 can involve performing line characterization routines by circuit 104, as discussed below. Since adjusting circuit 102 and converging equalizer 98 are interactive processes, these procedures can be time-consuming. The slow retrain can take as long as 6.5 seconds. Nonetheless, time is saved, even in the slow retrain operation, when compared to conventional modems because modem 54 advantageously does not utilize an echo canceler (not shown). The echo canceler typically must be reset during a retrain operation.

To save time, a rapid retrain operation can eliminate one or more of the above steps or can perform the above steps from predicted variables (variables which are initially closer to the desired value than initialization variables). In a rapid retrain operation, the line characterization step is eliminated, and circuit 102 and equalizer 98 are adjusted slightly or converged from a stored coefficient. For example, according to a rapid retrain operation, the center tap coefficient for equalizer 98 can be determined, and the remaining coefficients can be adjusted based on the difference between the determined center tap coefficient and the previous center tap coefficient.

According to another rapid retrain operation, prestored tap coefficients are utilized so equalizer 98 does not have to be significantly converged. The tap coefficients are chosen based upon conditions recognized by circuit 94, such as, telephone 80 (FIG. 2) being brought off-hook. The adjustment of the gain circuit 102 can be restricted to a range to save time.

System and application parameters associated with modem 54 and line 52 can define the amount of time required for a rapid retrain of modem 54. For example, a rapid retrain may occur in a particular amount of real time, such as, less than 0.5 seconds. A rapid retrain within 0.5 seconds assures that the transmission of data is not affected for perceivable delays as modem 54 is retrained. A 0.5 second retrain operation is a vast improvement over the conventional 6.5 seconds for initialization retrain operations. Alternatively, the rapid retrain operation may occur in a much shorter time period, particularly if error processor 96 and rapid retrain circuit 94 are able to determine what changes on subscriber line 52 have caused errors. Circuit 94 can react to those changes and access a database or other data indicative of coefficients for equalizer 98, gain parameters for circuit 102, data rates, or other criteria for appropriate communication of data on line 52. For example, such a database could be stored on computer 84 coupled to modem 54 (FIG. 2). Further still, a very rapid retrain operation could occur where equalizer 98 does not have to be converged, and only the gain of circuit 102 needs to be adjusted. Thus, rapid retrain circuit 94 is capable of retraining modem 54 in a rapid manner in response to error processor 96, discovering that there are errors in the communication of data on subscriber line 52.

When rapid retrain circuit 94 performs a retrain operation, data rates associated with modem 54 are adjusted to maximize the data rate, while maintaining the integrity of the communication. For instance, if error processor 96 determines that a particular number of errors are occurring, rapid retrain circuit 94 may adjust the data rate down, thereby reducing the size of the constellation. Error processor 96 can determine errors which require an adjustment of equalizer 98, such as, tangential error, radial error, or other errors. Error processor 96 can also react to Trellis-coding errors, Reed-Solomon errors, mean-squared error levels, or other errors. Alternatively, if error processor 96 determines that the mean-squared error level is below a threshold, rapid retrain circuit 94 can retrain modem 54 and adjust the data rate upward by increasing the size of the constellation or the symbol rate. The threshold used to compare the mean-squared error, as well as other errors, is variable according to user parameters and to the data rate.

Line characterization circuit 104 can perform a variety of operations to characterize line 52 for the development of tap coefficients for equalizer 98 and of other parameters for modem 54. Line characterization tests can be performed when modem 54 is at initialization, in an idle mode, or in a non-idle mode.

According to one line characterization test, tones or test patterns are transmitted across line 52 in accordance with a test protocol. Modems 54 and 56 (FIG. 2) cooperate to determine characteristics of line 52 based upon received tones or test patterns. In a non-idle mode, the test pattern can be sent and analyzed during the time the user is awaiting communications from the Internet. Further, a separate control channel can be utilized to send control information necessary to characterize line 52.

In another embodiment, circuit 104 can enter a learn mode and analyze line 52 under a variety of conditions. While in the learn mode, the user can bring telephone 80 (FIG. 2) off-hook in response to instructions generated by software on computer 84. Modem 54 can characterize line 52 during those particular conditions. Coefficients for equalizer 98 can be generated for those conditions and stored for a rapid retrain operation. Further still, circuit 104 can perform line-probing operations similar to the V.34 standard.

In yet another embodiment, an echo canceler (not shown) can be utilized on a transmit side of modem 54 to remove the transmitted signals in the transmit frequency spectrum. Control circuit 92 can analyze the characteristics in the transmit frequency spectrum of line 52. This analysis can be performed during non-idle modes. The portion of equalizer 98 on the transmit side can be adjusted according to the analysis to predistort or to preemphasize the transmitted signals. Digital frequency processing techniques can also include various error signal analysis, correction, and manipulation to determine when a rapid retrain is necessary as well as techniques for rapidly converging an equalizer associated with modem 54.

Figure 4:
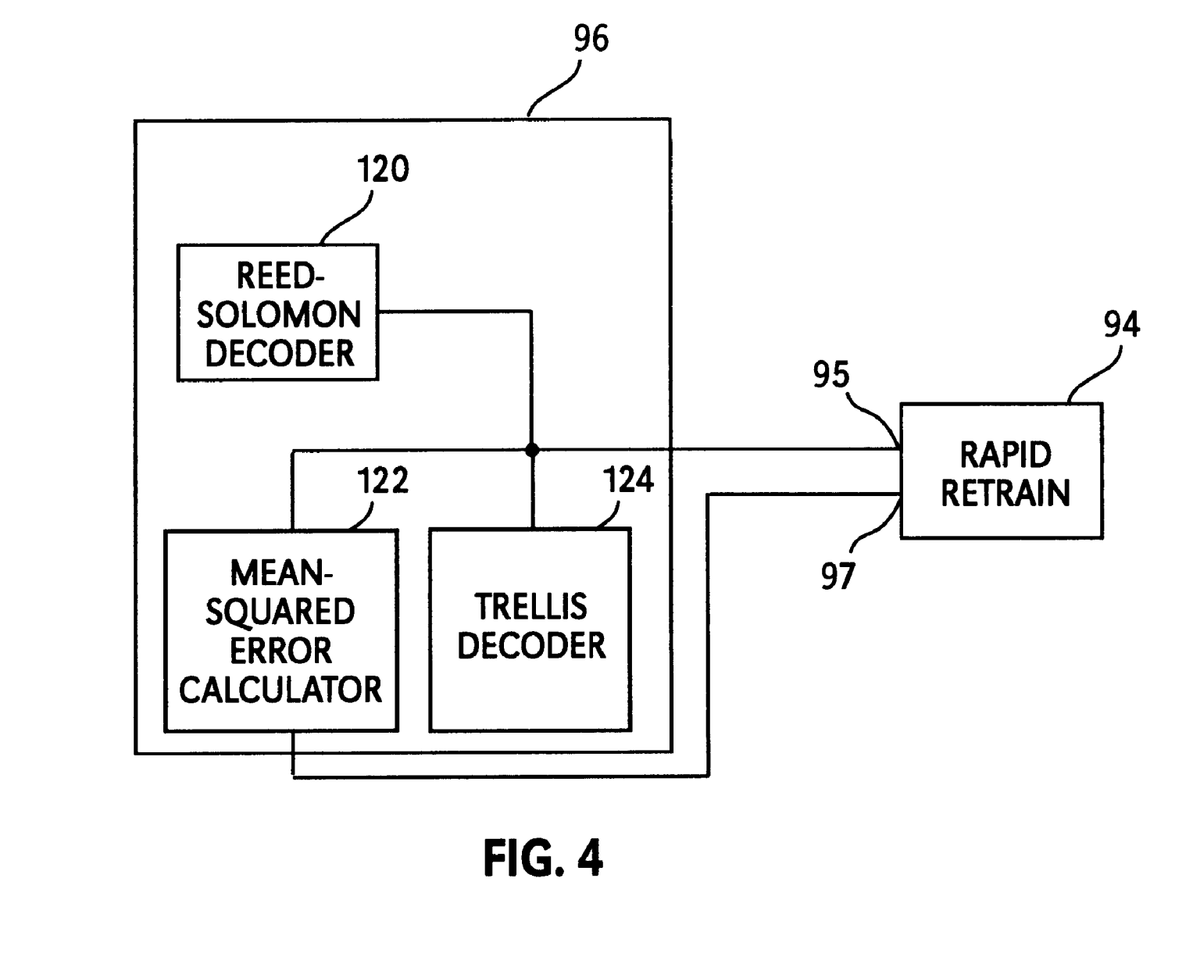
FIG. 4 is a more detailed schematic block diagram of the control circuit illustrated in FIG. 3.

With reference to FIG. 4, error processor 96 includes a Reed-Solomon decoder 120, a mean-squared error calculator 122, and a Trellis error decoder 124. Reed-Solomon decoder 120 analyzes frames of data provided from Trellis error decoder 124 and determines both if a frame error occurs and if errors are occurring in the frame. Reed-Solomon decoder 120 can correct errors as is well known in the art.

Reed-Solomon decoder 120, calculator 122, and Trellis error decoder 124 provide a lower-rate rapid retrain signal when error conditions indicate that the data rate should be lowered. Rapid retrain circuit 94 performs a rapid retrain operation and lowers the data rate in response to the lower-rate rapid retrain signal at input 95. In contrast, when mean-squared error calculator 122 provides a raise-rate rapid retrain signal at input 97, rapid retrain circuit 94 raises the data rate and performs a rapid retrain. Thus, modem 54 automatically raises or lowers its data rate to maintain high-speed and accurate communication in the presence of POTS-related impairments.

Although the data rates associated with modems 54 and 56 are somewhat lower than maximum data rates associated with conventional ADSL systems, these data rates are still significantly higher than conventional analog modem capabilities. The lower data rates allow modems 54 and 56 to use smaller constellation sizes and frequency division multiplexing, as well as to withstand POTS-related impairments.

Digital signal processing techniques can include rapid retrain operations where the modem is adjusted to changing subscriber line techniques due to POTS operations. Such adjustments can include adjusting automatic gain control circuit 102, converging equalizer 98, and error processing. Further, digital signal-processing techniques can include line characterization techniques performed by circuit 104 (FIG. 3).

Figure 5:
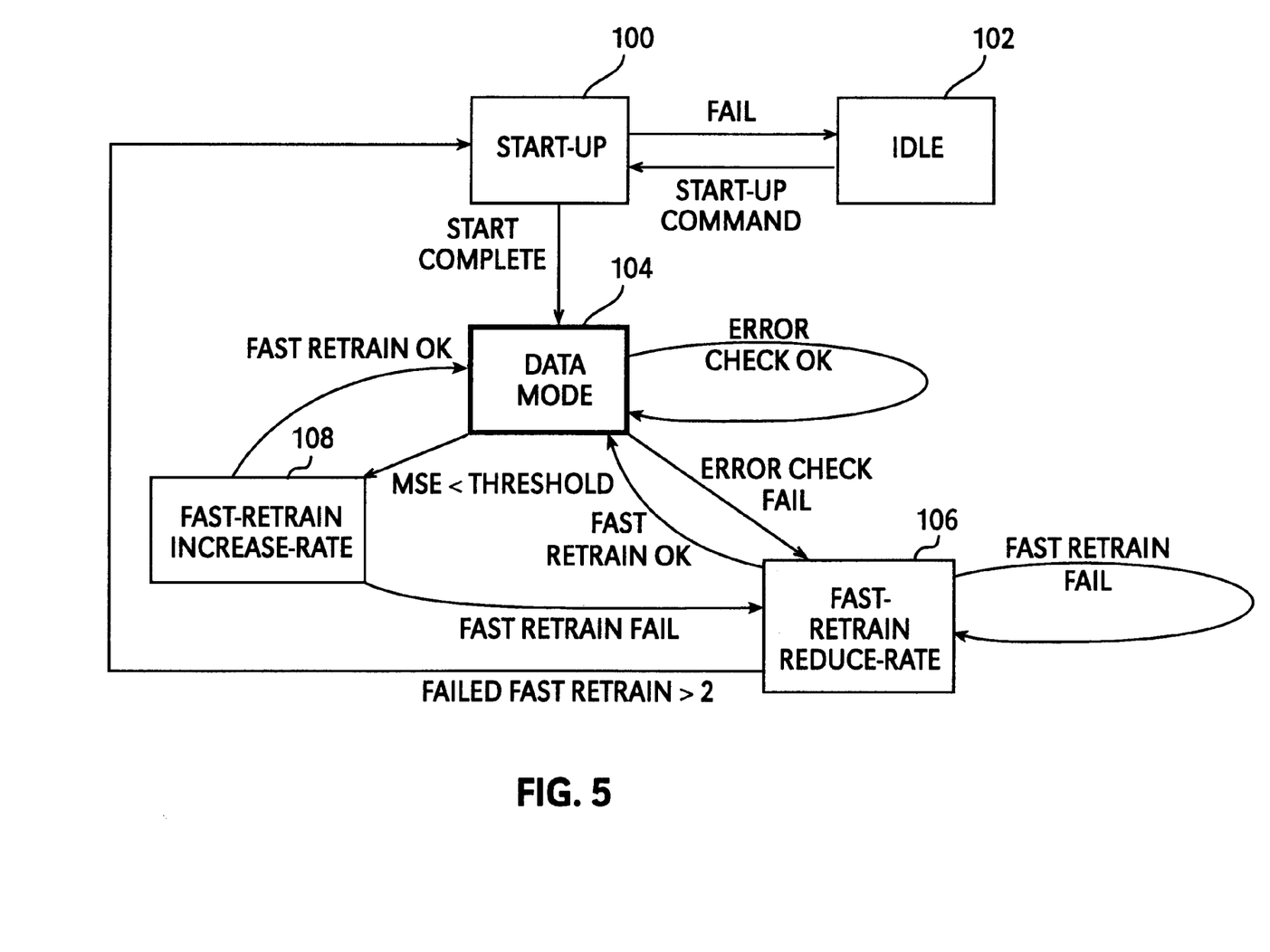
FIG. 5 is a state diagram showing an example of the operation of the DSL modem illustrated in FIG. 3.

With reference to FIG. 5, operation of modem 54 is described with reference to FIGS. 2–5. FIG. 5 is a state diagram showing rapid retrain operations for modem 54. Modem 54 preferably always provides the highest data rate available on line 52, according to a rate-adaptive digital subscriber line technique. Modem 56 should have the ability to set a maximum downstream data rate so that the telephone company can limit the maximum downstream data rate to avoid advantaging subscribers who live close to office 60. According to the technique, modems 54 and 56 constantly adjust the data rates to reach maximum data rate potential on subscriber line 52 (FIG. 2).

In FIG. 5, modem 54 (FIG. 2) is capable of a start-up state 100, an idle state 102, a data mode state 104, a fast-retrain reduce-rate state 106, and a fast-retrain increase-rate state 108. When off or idle, modem 54 transfers from idle state 102 to start-up state 100 when it receives a start-up command.

In start-up state 100, modem 54 is initialized. During initialization, timing is acquired from a remote modem, such as, modem 56, automatic gain circuit 102 is adjusted, equalizer 98 is converged, the carrier phase is locked, line 52 is characterized, and a data rate is selected. If start-up is successfully completed, modem 54 advances to data mode state 104, where data is communicated across subscriber line 52.

As data is communicated at the data rate selected during start-up state 100, error signals from error processor 96 are consistently checked. If the error signals are within an acceptable level, modem 54 is maintained in data mode state 104. However, if the error signals are above a particular level, modem 54 enters fast-retrain reduce-rate state 106. In state 106, modem 54 reduces the data rate, adjusts automatic control circuit 102, reacquires timing, and converges equalizer 98. Preferably, equalizer 98 is retrained from stored coefficient values to reduce the amount of time required for retraining. Alternatively, another mode (not shown) may be entered where just the automatic gain control 102 (FIG. 3) is adjusted, and the data rate is not changed to compensate for errors.

In state 106, if the fast retrain fails, another fast retrain is attempted. If more than two fast retrain attempts fail, modem 54 returns to start-up state 104. As at initialization, if start-up 100 fails, modem 54 enters idle state 102.

If the fast retrain operation is successfully completed, modem 54 returns to data mode state 104 and continues to communicate data at a lower data rate. The data rate can be adjusted incrementally or by other relationships. For example, if the errors are due to known POTS activity, particular data rates may be known to operate during that activity, and those data rates may be chosen.

In state 104, if the mean-squared error signal provided by mean-squared error calculator 122 is below a threshold, modem 54 enters fast-retrain increase-rate state 108. Modem 54 is retrained in state 108 similarly to state 106, except that the data rate is increased. If the fast-retrain operation is completed successfully, modem 54 changes from state 108 to state 104 and continues normal data communication operations at the faster rate. If the fast retrain operation fails in state 108, modem 54 enters state 106 and performs a fast-retrain reduce-rate operation.

Figure 6:
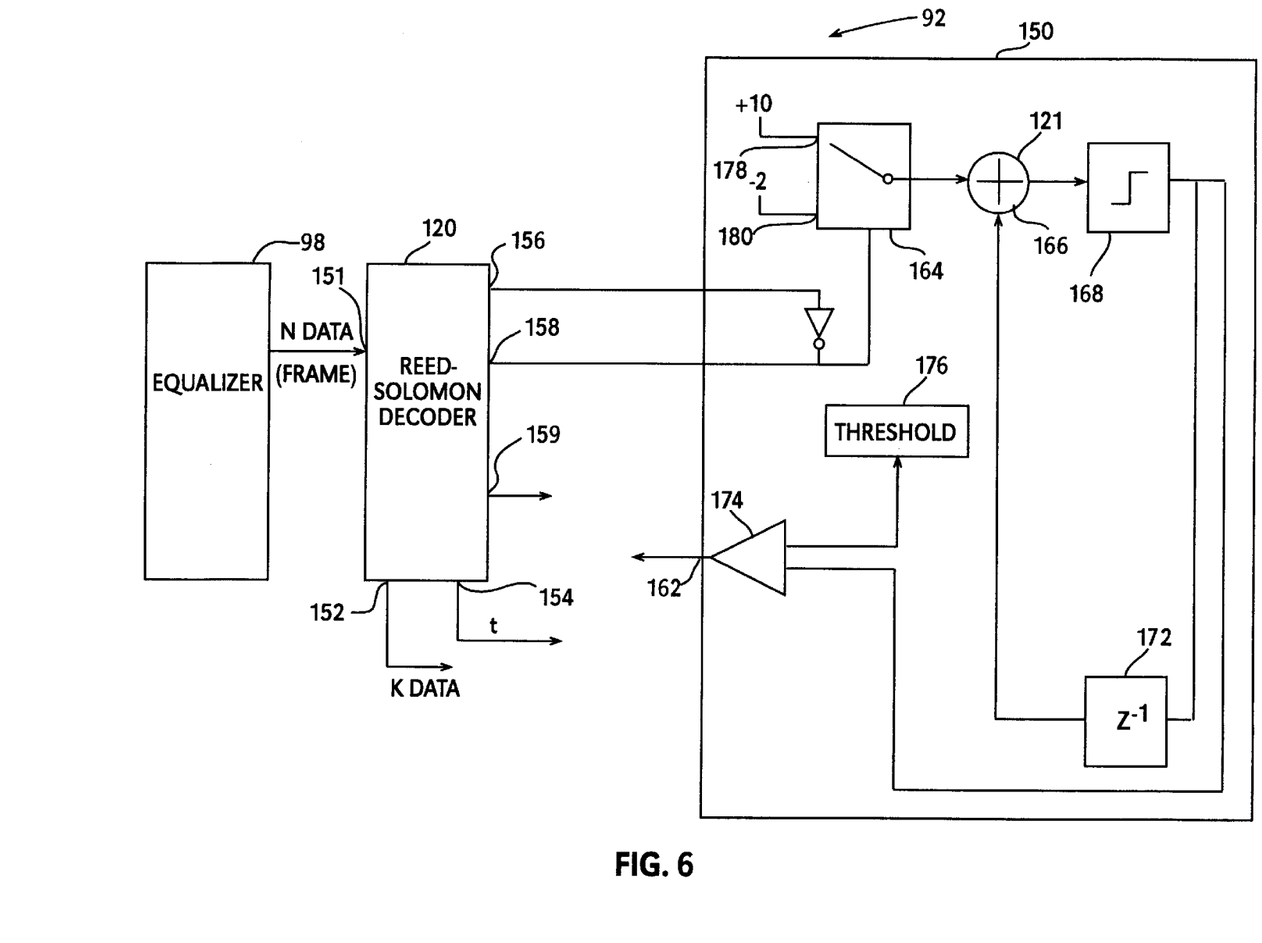
FIG. 6 is a more detailed schematic diagram of a synchronization circuit utilizing a Reed-Solomon decoder and a leaky integrator for use in the DSL modems illustrated in FIG. 2.

With reference to FIG. 6, control circuit 92 includes equalizer 98, Reed-Solomon decoder 120, and synchronization signal generator 150. Equalizer 98 is coupled to Reed-Solomon decoder 120. Although circuit 92 is discussed below as though it is part of modem 54, circuit 92 can be part of either modem 54 or 56 (FIG. 2). Utilizing the present invention with modem 54 is particularly advantageous because modem 54 generally receives more data than modem 56.

Reed-Solomon decoder 120 can be replaced by any type of frame decoder which can generate a packet or frame error signal. For example, ATM error-processing circuits, SONET frame processors, or other frame decoders can be utilized. The frame error signal is a signal that indicates that the frame has at least one error which will not or cannot be corrected.

Reed-Solomon decoder 120 preferably receives N bytes of data from equalizer 98 in the form of a frame of data at an input 151. Alternatively, Reed-Solomon decoder 120 can receive the N bytes of data or frame from other portions of control circuit 92. Reed-Solomon decoder 120 processes the frame of data and generates K bytes of data at an output 152. The K bytes of data represent the payload or actual data transmitted in the frame. The K bytes of data are utilized by other portions of modem 54 of circuit 92.

Additionally, Reed-Solomon decoder 120 provides an indication of the number of bytes or symbols which are in error (e.g., t) at an output 154. Decoder 120 further provides a zero-error signal at an output 159 which indicates that t=0 or that no symbols are in error. The signal at outputs 154 and 159 can be utilized by other portions of control circuit 92. For example, the zero-error signal can be utilized by modem 54 to determine that a raise-rate retrain operation is necessary.

Reed-Solomon decoder 120 also provides a frame error signal at an output 156 and a no-frame error signal at an output 158. The frame error signal indicates that the frame cannot be corrected. Generally, the frame error signal is provided at output 156 when the number of errors in the frame received at input 151 is greater than t, where $t=(N-K)/2$. When the number of errors is greater than t, Reed-Solomon decoder 120 is not able to correct the frame of data and provides a frame error signal at output 156. Generally, the frame error signal causes control circuit 92 in modem 54 to request that the frame be reset from the source of the frame. If the number of errors is less than t (e.g., decoder 120 can correct the frame), a no-frame error signal can be provided at output 158.

Synchronization signal generator 150 receives the frame error signal at output 156 and the no-frame error signal at output 158. Alternatively, only one of the frame error signal and the no-frame error signal provided by decoder 120 is received by generator 150. Generator 150 utilizes the no-frame error signal or the frame error signal to determine how many frame errors are occurring in a particular amount of time. A large number of frame error signals indicate resynchronization is necessary. If a large number of frame errors are occurring in a particular amount of time, circuit 150 determines that modem 54 needs to reacquire frame synchronization.

Generator 150 provides a synchronization error signal at an output 162 to indicate modem 54 should perform a frame resynchronization operation in accordance with a flow chart 200 described with reference to FIG. 7. Generator 150 is configured as a "leaky" integrator that includes a parameter selection circuit 164, an adder 166, a negative limit circuit 168, a sampler 172, a comparator 174, and a buffer 176.

Parameter selection circuit 164 responds to the frame error signal, the no-frame error signal, or both. If the frame error signal is present, a first factor or parameter provided at an input 178 of circuit 164 is then supplied to adder 166. If the frame error signal is not present, then a second factor or parameter provided at an input 180 of circuit 164 is supplied to adder 166. Preferably, the first parameter is +10 and the second parameter is −2, although any values can be utilized in accordance with user parameters and data rates. Alternatively, the first parameter and the second parameter can be variable and adjusted in accordance with data rates and characteristics of subscriber line 52 (FIG. 3).

Adder 166 adds the first parameter or the second parameter from circuit 164 to a stored sum received from sampler 172. The first or second parameters are added once every time a frame is received.

The new sum from adder 166 is provided to circuit 168, which ensures that the sum does not fall below zero. Circuit 168 provides the new sum to comparater 174 and to sampler 172. Sampler 172 stores the new sum provided by circuit 168 as the stored sum. Comparater 174 compares the new sum to a threshold value stored in a buffer 176.

The threshold value stored in buffer 176 can be a fixed value. Preferably, the threshold value is a variable in accordance with data rates associated with modem 54 and with user-set parameters. For example, buffer 176 may store a value of 140,000 for a threshold value. Comparater 174 provides a synchronization error signal at output 162 when the sum is greater than the threshold provided by buffer 176.

The operation of circuit 150 will be described with reference to FIG. 6 as follows. When a frame error occurs, decoder 120 generates the frame error signal provided at output 156. Circuit 164 provides a value of +10 to adder 166 in response to the frame error signal. This value is then added to a stored sum provided from sampler 172 to generate a new sum. The new sum from adder 166 is provided to circuit 168 and is set equal to zero by circuit 168 if the new sum is below zero. Circuit 168 provides the new sum to comparater 174. If a relatively large number of frame error signals have been produced by Reed-Solomon decoder 120 over a short period of time, the sum will be greater than the threshold stored in buffer 176, and comparater 174 provides the synchronization error signal at output 162.

If the frame error signal is not provided at output 156 or the no-frame error signal is provided at output 158, circuit 164 provides a value of −2 to adder 166. Adder 166 then adds the value of −2 to the stored sum provided from sampler 172 to generate the new sum. The new sum from adder 166 is provided to circuit 168, which then provides the new sum to comparater 174. Therefore, when frames are provided which do not generate a frame error signal, the stored sum is decreased. Generator 150 only generates the synchronization error signal when a relatively large number of frame error signals occurs over a number of data frames.

Such a system ensures that the errors in the frames received at input 151 are essentially due to a synchronization problem, as opposed to other problems on line 52. Synchronization problems can include loss of signals, distortion caused by impulses, or momentary loss of connections. These impairments are often due to varying subscriber line characteristics caused by analog equipment, such as, telephones 80, machine 81 and modem 82 (FIG. 2). The synchronization error signal can be utilized to begin a retrain operation, as discussed with reference to FIG. 5. Alternatively, control circuit 92 can perform a resynchronization operation according to flow chart 200, as discussed with reference to FIG. 7. By performing the resynchronization operation according to flow chart 200, a retrain operation does not need to be performed, thereby saving valuable communication time.

Figure 7:
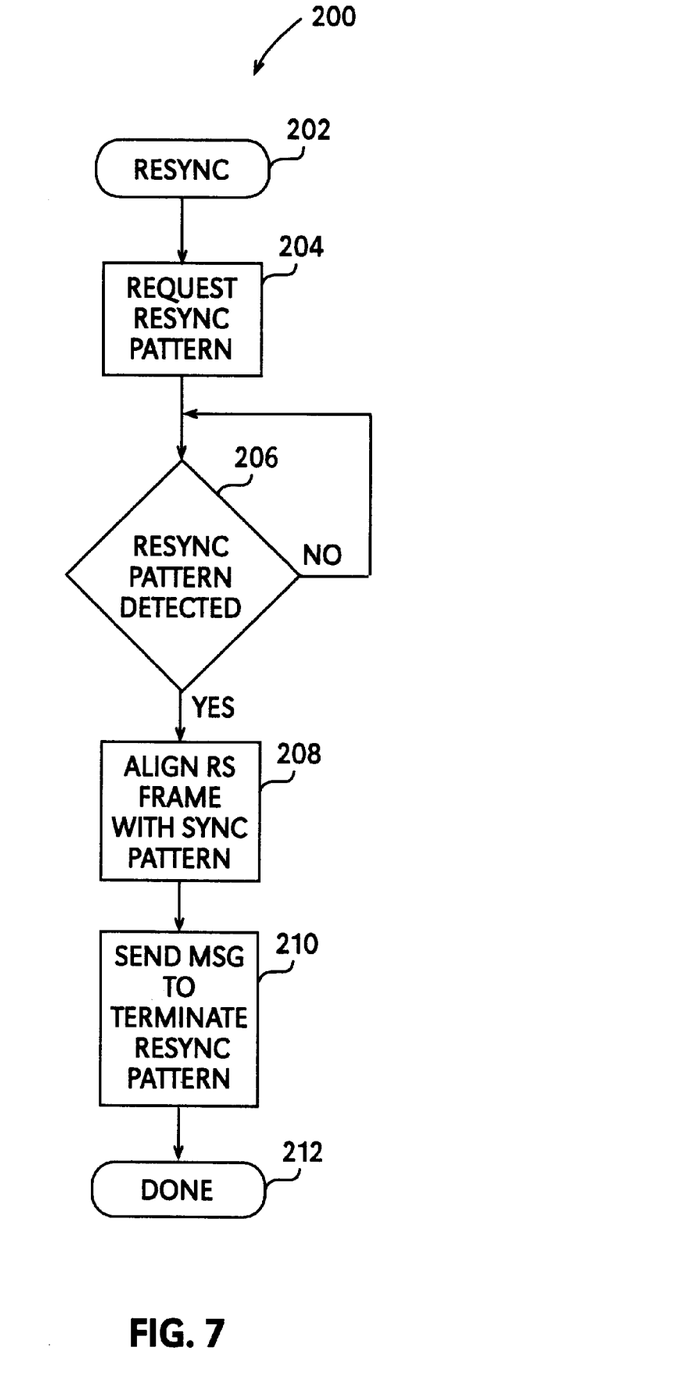
FIG. 7 is a flow chart demonstrating the operation of a resynchronization operation.

With reference to FIG. 7, control circuit 92 (FIG. 3) at a step 202 begins a resynchronization operation 200 in response to the synchronization error signal generated at output 162 (FIG. 6). At a step 204, control circuit 92 requests the generation of a resynchronization pattern from modem 56, e.g., the modem with which modem 54 is in communication (FIG. 2). Control circuit 92 waits at a step 206 to receive the resynchronization pattern. If the resynchronization pattern is detected, control circuit 92 advances to a step 208. Otherwise, control circuit 92 waits at step 206. After a particular amount of time, modem 54 enters a failure mode if the resynchronization pattern is not detected.

At a step 208, control circuit 92 aligns Reed-Solomon decoder 120 (FIG. 4) with the resynchronization pattern. At a step 210, modem 54 sends a message to modem 56 to terminate sending the resynchronization pattern. At a step 212, control circuit 92 completes flowchart 200 and resumes normal communication operations. Preferably, resynchronization operation maintains other parameters associated with modem 54. After resynchronization, the stored sum in sampler 172 is set to zero.

Alternatively, operation 200 can include other steps related to retraining modem 54, as discussed with reference to FIG. 5, such as, providing equalization parameters, adjusting automatic gain circuit 102, or other steps. In another alternative to operation 200, other resynchronization operations can be utilized, such as, transmitting a known sequence of constellation points according to the V.34 standard and setting timing marks accordingly. The resynchronization pattern can also be provided in normal data transmissions or across a low-speed channel for synchronization data.

As stated throughout the application, the present invention can also be employed in modem 56 or in any communication system. The description of locating control circuit 92 in modem 54 is in an exemplary fashion only. Additionally, although a Reed-Solomon decoder 120 is discussed, other frame decoders can be utilized. Further still, generator 150 can be utilized in any type of communication system which utilizes frames of data.

System and application parameters associated with modem 54, modem 56, and line 52 can further define the configuration of generator 150 and the point at which generator 150 determines a synchronization error has occurred. For example, generator 150 should provide the synchronization error signal when the frame is genuinely out of synchronization. In this way, additional resynchronization information and hardware does not have to be utilized to determine a synchronization error. The resynchronization error may be indicated by a particular amount of real time of receiving frame error signals, such as, two seconds. The real time may be associated with real world events, such as, hooking or unhooking telephone equipment (e.g., telephones 80 (FIG. 2)).

It is understood that, while the detailed drawings and specific examples given describe preferred exemplary embodiments of the present invention, they are for the purpose of illustration only. The apparatus and method of the invention is not limited to the precise details and conditions disclosed. For example, although QAM signals and DSL communication systems are utilized, other signals and systems implement the invention. Also, although parameters related to a resynchronization operation are discussed, the synchronization operation may include a variety of steps for ensuring the integrity of the frames of data. Various changes may be made to the details disclosed without departing from the spirit of the invention, which is defined by the following claims.

What is claimed is:

1. A digital subscriber line modem, comprising:

a synchronization circuit; and a Reed-Solomon decoder having a frame error output, wherein the synchronization circuit includes:

an input coupled to the frame error output;

an output; and a control circuit coupled to the input and the output, the control circuit receiving a frame error output signal at the frame error output and generating a synchronization signal in response to a threshold of frame error output signals occurring during communication of a number of frames.

2. The digital subscriber line modem of claim 1, wherein the control circuit is a digital signal processor implementing a leaky integrator.

3. The digital subscriber line modem of claim 2, wherein the leaky integrator adds a first value to a sum in response to the frame error output signal and subtracts a second value to the sum in response to an absence of the frame error output signal.

4. The digital subscriber line modem of claim 3, wherein the sum is compared to a value to determine if the threshold of frame error output signals has been received.

5. The digital subscriber line modem of claim 4, wherein the threshold is variable and is related to a data rate of the modem.

6. The digital subscriber line modem of claim 5, wherein the threshold is user programmable.

7. A method of generating a synchronization signal in a modem for use with a subscriber line, the modem having a Reed-Solomon decoder with a frame error output, the Reed-Solomon decoder providing a frame error output signal at the frame error output, the frame error output signal having a first characteristic when the Reed-Solomon decoder is unable to correct errors in the frame and a second characteristic when the Reed-Solomon decoder is able to correct errors in the frame, the method comprising:

receiving the frame error output signal from the Reed-Solomon decoder;

adding a first value to a sum if the frame error output signal has the first characteristic;

subtracting a second value from the sum if the frame error output signal has the second characteristic; and generating the synchronization signal if the sum is above a threshold.

8. The method of claim 7, wherein the first value and second value are not equal.

9. The method of claim 8, wherein the first value is at least twice as large as the second value.

10. The method of claim 7, wherein the first and second characteristics are voltage levels.

11. The method of claim 7, wherein the sum has a minimum value, and the sum cannot reach a value below the minimum value.

12. The method of claim 11, wherein the sum is reset to the minimum value after the synchronization signal is generated.

13. A method of generating a synchronization signal in a modem, the modem having a decoder with a frame error output, the decoder providing a frame error output signal at the frame error output, the frame error output signal having a first characteristic when the decoder is unable to correct errors in the frame and a second characteristic when the decoder is able to correct errors in the frame, the method comprising:

receiving the frame error output signal;

adding a first value to a sum if the frame error output signal has the first characteristic;

subtracting a second value from the sum if the frame error output signal has the second characteristic; and generating the synchronization signal if the sum is above a threshold;

wherein the modem is a digital subscriber line modem.

14. A digital subscriber line modem for transmitting and receiving frames of data on a subscriber line, the modem comprising:

error-processing means for generating a frame error signal when a frame contains errors which are not corrected by the error-processing means; and signal-generating means for receiving the frame error signal and for providing a synchronization signal in response to a quantity of frame error output signals being received over a number of frames;

wherein the error-processing means is a Reed-Solomon decoder.

15. The modem of claim 14, wherein the modem is a splitterless modem.

16. The modem of claim 14, wherein the error-processing means can correct N units of data in a frame and provides the frame error signal when the number of errors in the frame exceeds N.

17. The modem of claim 16, wherein the frame is sent as quadrature amplitude modulated signals.

18. The modem of claim 14, wherein the modem is directly coupled to the subscriber line without a splitter.

19. The modem of claim 14, wherein the signal-generating means adds a first value to a sum in response to the frame error output signal and subtracts a second value to the sum in response to an absence of the frame error output signal.

20. The modem of claim 19, wherein the sum is compared to a threshold to determine if the quantity of the frame error output signals received over the number of frames.

* * * * *